(12) United States Patent
Edwards

(10) Patent No.: US 8,049,631 B1
Edwards
(45) Date of Patent: Nov. 1, 2011

(54) SYSTEM AND METHOD FOR DETERRING IMPAIRED VEHICLE OPERATION

(76) Inventor: Thomas C. Edwards, Rockledge, FL (US)

( * ) Notice: Subject to any disclaimer, the term of this patent is extended or adjusted under 35 U.S.C. 154(b) by 328 days.

(21) Appl. No.: 12/372,175

(22) Filed: Feb. 17, 2009

Related U.S. Application Data (60) Provisional application No. 61/066,679, filed on Feb. 22, 2008, provisional application No. 61/066,520, filed on Feb. 21, 2008.

(51) Int. Cl.
*G08B 23/00* (2006.01)
(52) U.S. Cl. .................. 340/576; 340/573.1; 340/426.13
(58) Field of Classification Search .............. 340/573.1, 340/575, 576, 426.13, 426.16, 426.35, 426.36, 340/5.24, 5.28, 5.3, 426.1, 426.3; 307/10.2, 307/10.3, 10.4; 235/382
See application file for complete search history.

(56) References Cited

U.S. PATENT DOCUMENTS

| | | | |
|---|---|---|---|
| 3,139,561 A | 6/1964 | Madonna | |
| 3,311,187 A | 3/1967 | Haggard | |
| 3,610,943 A | 10/1971 | Jones | |
| 3,755,777 A * | 8/1973 | Lee ............................. | 307/10.4 |
| 3,786,656 A | 1/1974 | Suprowich | |
| 3,794,968 A | 2/1974 | Hill | |
| 3,867,823 A | 2/1975 | Waltower | |
| 3,918,176 A | 11/1975 | Abernethy, III et al. | |
| 3,942,151 A | 3/1976 | Takeuchi | |
| 4,058,911 A | 11/1977 | Story | |
| 4,093,870 A | 6/1978 | Epstein | |
| 4,141,332 A * | 2/1979 | Wyler ......................... | 123/179.2 |
| 4,158,198 A | 6/1979 | Ochiai | |
| 4,978,303 A | 12/1990 | Lampbell | |
| 5,596,317 A * | 1/1997 | Brinkmeyer et al. ........ | 340/5.26 |
| 5,745,026 A * | 4/1998 | Kokubu et al. ............ | 340/286.01 |
| 6,501,369 B1 * | 12/2002 | Treharne ..................... | 340/5.22 |
| 6,819,248 B2 * | 11/2004 | Gotfried .................... | 340/573.1 |
| 7,079,042 B2 * | 7/2006 | Reim ........................ | 340/815.45 |
| 7,236,094 B2 | 6/2007 | Jones | |
| 2003/0006879 A1 * | 1/2003 | Kang et al. .................. | 340/5.61 |
| 2005/0099310 A1 | 5/2005 | Jones | |
| 2006/0253711 A1 | 11/2006 | Kallmann | |

FOREIGN PATENT DOCUMENTS

| | | |
|---|---|---|
| EP | 1703045 | 9/2006 |
| WO | WO9632556 | 10/1996 |

* cited by examiner

*Primary Examiner* — Van T. Trieu
(74) *Attorney, Agent, or Firm* — Brian S. Steinberger; Phyllis K. Wood; Law Offices of Brian S. Steinberger, P.A.

(57) ABSTRACT

A system of determining an impairment level of a vehicle operator and preventing operation of the vehicle in an impaired state and method of using the same that comprises a key portion to initiate the starting of the vehicle, an electrical source to power the system, a random pattern generator, a display, a user input to allow the user to attempt to replicate the generated random pattern, a processor that compares data from the user input to the generated random pattern to determine if the input sufficiently matches the generated random pattern, and an access preventing feature disabling the key portion from starting the vehicle unless the processor determines the user input sufficiently matches the generated random pattern.

25 Claims, 6 Drawing Sheets

SYSTEM AND METHOD FOR DETERRING IMPAIRED VEHICLE OPERATION

This application claims the benefit of priority to U.S. Provisional Patent Application Nos. 61/066,679 filed on Feb. 22, 2008 and 61/066,520 filed on Feb. 21, 2008.

FIELD OF THE INVENTION

The present invention generally relates to a system and method for determining whether a vehicle operator is impaired and preventing the operation of a vehicle if the operator is impaired, or minimizing the opportunity of an impaired person from accessing a secured location.

BACKGROUND AND PRIOR ART

Driving under the influence ("DUI") continues to be a major problem causing thousands of people to be killed and injured each year. Police agencies have increased enforcement efforts in an attempt to apprehend drivers who are operating vehicles while impaired. This increased enforcement also serves as a deterrent to others who forego operating a vehicle while impaired for fear of being arrested for DUI. Educational programs and advocacy groups also discourage people from driving under the influence.

A person who is arrested for DUI faces significant penalties ranging from loss of driving privileges and fines, to incarceration. Additionally, a person charged with DUI will often incur significant legal expenses, and the stigma associated with a DUI conviction. If someone is seriously injured or killed by a person driving under the influence, the driver almost certainly will face a lengthy prison term. Unfortunately, a person who has consumed too much alcohol, or is impaired by some other substance such as illegal drugs or prescription medication, often do not realize the extent of their impairment.

Many prior attempts at preventing the operation of vehicle by an impaired driver have focused almost exclusively on a person impaired by alcohol. These previous attempts often involve a breathalyzer that is connected to a vehicle's ignition that prevents the starting of the vehicle if the person's blood alcohol level is a predetermined threshold. Such a system often involves a very expensive modification to a vehicle to install such a system. For example, U.S. Pat. No. 7,236,094 discloses a method for collecting and analyzing data from the proximity of a potential driver to determine whether the potential driver is under the influence of intoxicating substances and disabling an automotive ignition system if the driver is determined to be under the influence of intoxicating substances. U.S. Patent Application No. 2006/0253711 describes a biometric safety and security system that is designed to prevent a person that is inebriated from starting the vehicle. The system includes an electronics circuit, a fingerprint scanner, a speech verifier, a breath analyzer and the ignition key. U.S. Pat. No. 6,819,248, EP 1703045 and WO 96/32556 teach a substance detector configured to detect a substance ingested by a user and a blocking device to disable the operability of the vehicle when a substance is detected. This type of device can be defeated by the user simply drawing alcohol-free air through the device, the device does not evaluate the memory or neuro-motor capabilities of the user and for the device to be effective, the device should be calibrated which increases the cost to the user.

Another type system for inhibiting a driver from staring the ignition of a vehicle is described in WO 96/32556, EP 1703045A1 and U.S. Pat. No. 6,819,248 prevents the key from being inserted into the ignition. The key includes a stop device which prevents the key shank from fully entering the lock receptacle. Both devices include a breathalyzer type of device for determining if the person's blood alcohol level is a predetermined threshold and preventing the key shank from being inserted into the ignition when the detected level is above the predetermined threshold. As with the previously described breathalyzer type devices, the system is easily defeated.

Additionally, by only measuring a driver's blood alcohol level, there is no way to tell if the driver is impaired by an illegal drug or a medication. Further, such a system does not truly indicate if a person is impaired, but rather base the test result solely on preset thresholds. Thus, a person might be impaired, but have a blood alcohol level below a preset threshold and be allowed to operate the vehicle, even though the person is impaired.

Other attempts at preventing the operation of vehicle by an impaired driver have focused on a person memory and/or manual dexterity to determine a level of impairment. U.S. Pat. Nos. 4,093,870, 3,867,823, 3,786,656 and 3,139561 discloses apparatus that include a container housing a key and a combination lock for opening the container to access the key necessary for operating the vehicle. These systems test the driver's ability to recall the combination. U.S. Pat. Nos. 4,978,303, 3,942,151 and 3,610,943 teach different systems and methods for testing the drivers memory by his/her ability to repeat an alphanumeric sequence; and U.S. Pat. Nos. 4,058, 911, 3,918,176 and 3,794,968 test the driver's visual ability to determine spatial relationship of objects. A problem with most of these prior art devices is that they must be installed into the vehicle's ignition system at a significant cost to the owner.

Therefore, a need exists for a system for deterring operating a vehicle while impaired that does not require an expensive modification of a vehicle, is capable if determining impairment of a vehicle operator regardless of the cause of the impairment, and is capable of determining if an individual is impaired, irrespective of an amount of impairing substance the vehicle operator has consumed.

SUMMARY OF THE INVENTION

According to one embodiment, a system for determining impairment of a vehicle operator comprises a key portion, an electrical source to power the system, a random pattern generator, a display, a user input, a processor, and an access preventing feature. The key portion is adapted to initiate the starting of a vehicle. The random pattern generator is adapted to generate a random pattern. The display is adapted to display the random pattern. The user input is adapted to allow the user to attempt to replicate the generated random pattern. The processor compares the data from the user input to the generated random pattern and determines of the input sufficiently matches the generated random pattern. The access preventing feature disables the key portion from initiating the starting of the vehicle unless the processor determines the user input sufficiently matches the generated random pattern.

According to one process, a method determines an impairment level of a vehicle operator and prevents the operation of the vehicle in an impaired state. A system to determine the impairment of a vehicle operator is provided. The system has a key portion adapted to initiate the starting of a vehicle and an access preventing feature to disable the key portion from initiating the starting of the vehicle. A random pattern is generated for the vehicle operator to attempt to replicate. The random pattern is displayed to the vehicle operator. Input is accepted from the vehicle operator. Input from the vehicle operator is compared to the generated random pattern. The method determines whether the accepted input sufficiently matches the generated random pattern. The access preventing feature is disabled when it is determined that the input sufficiently matches the generated random pattern.

According to another embodiment, a system for determining impairment of a vehicle operator comprises a transmitter, an electrical source to power the system, a random pattern generator, a display, a user input, a processor, and an access preventing feature. The transmitter is adapted to initiate the starting of a vehicle. The random pattern generator is adapted to generate a random pattern. The display is adapted to display the random pattern. The user input is adapted to allow the user to attempt to replicate the generated random pattern. The processor compares the data from the user input to the generated random pattern and determines if the input sufficiently matches the generated random pattern. The access preventing feature disables the key portion from initiating the starting of the vehicle unless the processor determines the user input sufficiently matches the generated random pattern.

According to another process, a method determines an impairment level of a vehicle operator and prevents the operation of the vehicle in an impaired state. A system for determine the impairment of a vehicle operator is provided. The system is adapted to initiate the starting of a vehicle and has an access preventing feature to disable the system from initiating the starting of the vehicle. A random pattern is generated for the vehicle operator to attempt to replicate. The random pattern is displayed to the vehicle operator. Input is accepted from the vehicle operator. Input form the vehicle operator is compared to the generated random pattern. The method determines whether the accepted input sufficiently matches the generated random pattern. The access preventing feature is disabled when it is determined that the input sufficiently matches the generated random pattern.

BRIEF DESCRIPTION OF THE DRAWINGS

FIG. 2b is a bottom view of the system of FIG. 2a;

FIG. 3a is a top view of a system for deterring the operation of a vehicle while impaired according to a further embodiment;

FIG. 3b is a bottom view of the system of FIG. 3a;

FIG. 3c is a partial exploded view of the access preventing feature and the key shank portion of the system of FIG. 3a;

FIG. 3d is a partial cross-sectional view of the system of FIG. 3a with an access preventing feature in an extended position;

FIG. 3e is a partial cross-sectional view of the system of FIG. 3a with the access preventing feature in a retracted position;

FIG. 4a is a top view of a system for deterring the operation of a vehicle while impaired according to yet another embodiment;

FIG. 4b is a bottom view of the system of FIG. 4a;

FIG. 4c is a partial cross-sectional view of the system of FIG. 4a with an access preventing feature disabled;

FIG. 5a is a top view of a system for deterring the operation of a vehicle while impaired according to yet a further embodiment;

FIG. 5b is a bottom view of the system of FIG. 5a;

FIG. 5c is a pictorial view of the system of FIG. 5a with an access preventing feature disabled;

FIG. 5d is a pictorial view of the system of FIG. 5a for a vehicle with a start button ignition;

FIG. 6 is a top view of a system for deterring the operation of a vehicle while impaired according to still yet another embodiment.

DESCRIPTION OF THE PREFERRED EMBODIMENT

While this invention is susceptible of embodiments in many different forms, there is shown in the drawings and will herein be described an example of the invention. The present disclosure is to be considered as an example of the principles of the invention. It is not intended to limit the broad aspect of the invention to the examples illustrated.

Figure 1:
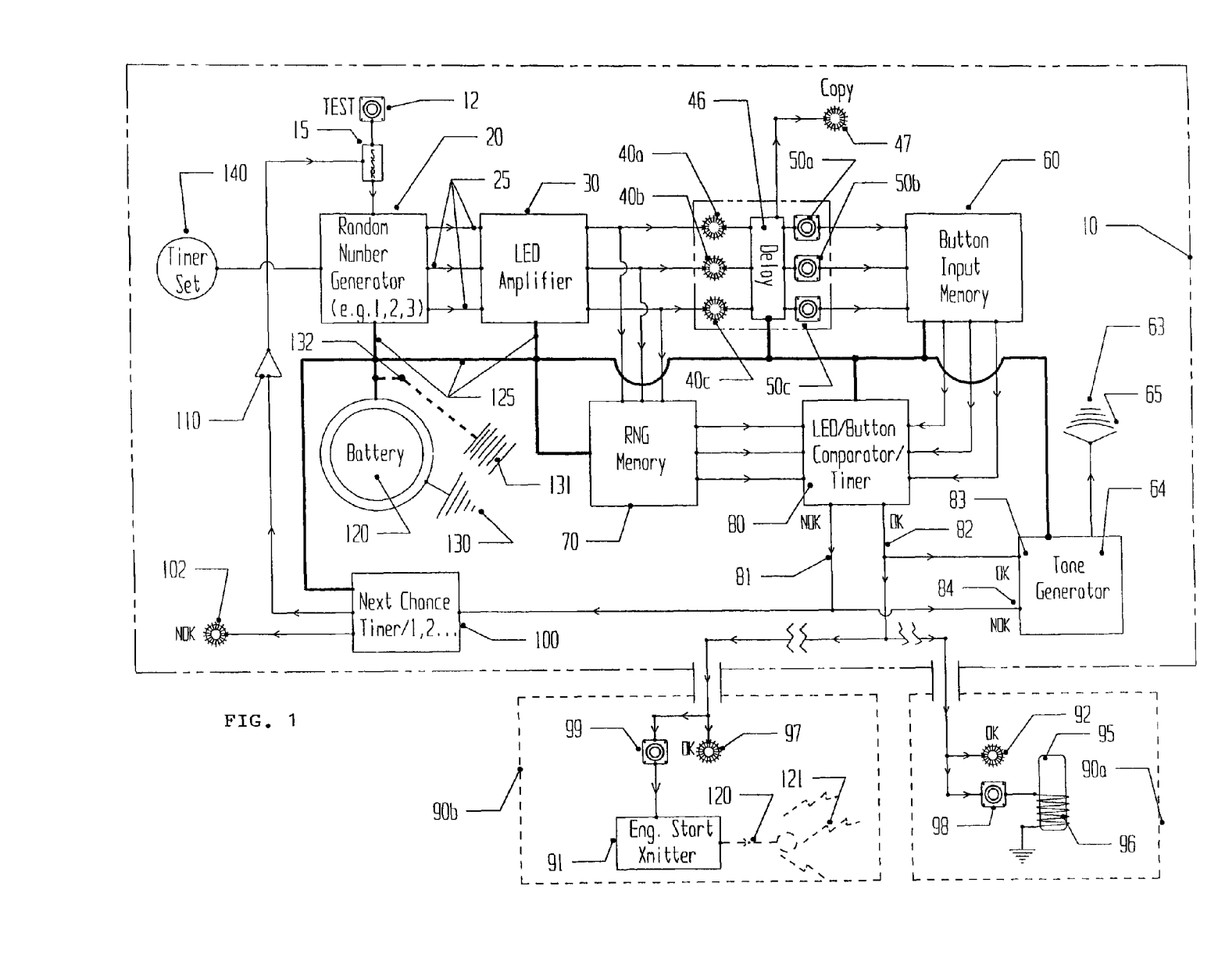
FIG. 1 illustrates a schematic diagram of a system for deterring the operation of a vehicle while impaired according to one embodiment.

FIG. 1 is a schematic diagram illustrating several functional components of a system for deterring the operation of a vehicle while impaired 10 for implementing the present invention. Those of ordinary skill in the art will appreciate that system 10 includes many more components than those shown in FIG. 1. However, it is not necessary that all these components be shown in order to disclose an illustrative embodiment for practicing the present invention.

The system 10 has an activation switch 12 adapted to begin the testing process when a vehicle operator desires to start a vehicle. The activation switch 12 produces an electronic signal when depressed that flows through a relay 15. The relay 15 is a normally electrically conducting relay, but the relay is adapted to receive a deactivating signal in certain circumstances as described herein. After the signal has passed through the relay 15 it reaches a random number generator ("RNG") 20. The RNG 20 generates a plurality of random output signals. According to one embodiment, the random output signals are generated one at a time, with an appropriate predetermined time gap between each signal. The plurality of random output signals generated by the RNG 20 pass through a number of conductors 25 to an amplifier 30. The amplifier 30 may be needed to amplify the signals generated by the RNG 20 to produce brighter illumination of a plurality of Light Emitting Diodes ("LEDs") 40a-40c, or other types of lights. The signals generated by the RNG 20 additionally transmit to a RNG memory 70. The RNG memory 70 stores the output of the RNG 20 for comparison with inputs provided by the vehicle operator.

The signals produced by the RNG 20 transmit to a plurality of LEDs 40a-40c to produce a random pattern for a vehicle operator to emulate using a plurality of user input buttons 50a-50c. As shown in FIG. 1, a single user input button, such as buttons 50a-50c, corresponds to each of the LEDs 40a-40c. Once the signals generated by the RNG 20 reach the LEDs 40a-40c, the LEDs 40a-40c light up one at a time in a random fashion according to the action of the RNG 20 to present the vehicle operator a pattern to replicate. A delay timer 46 may also be included to create a time delay between the presentation of the random pattern on the LEDs 40a-40c and the input by the vehicle operator via the input buttons 50a-50c. Such a time delay additionally tests the vehicle operator's ability to recall information, making it less likely that an impaired vehicle operator would be able to replicate the pattern. Once the time delay passes an LED 47 may be illuminated to indicate that the vehicle operator may attempt to replicate the pattern.

Once the pattern has been presented to the vehicle operator on the LEDs 40a-40c, the vehicle operator attempts to replicate the pattern using the input buttons 50a-50c. Depressing the plurality of input buttons 50a-50c generates signals that are sent to a button input memory 60. The button input memory 60 and the RNG memory 70 are operatively connected to a comparator 80. The comparator 80 evaluates whether the vehicle operator successfully duplicated the random pattern displayed on the LEDs 40a-40c with the input buttons 50a-50c. The comparator 80 further includes a timer so the comparator 80 may evaluate the length of time the vehicle operator needed to enter the random pattern.

The comparator 80 not only times the entry from the input buttons 50a-50c, but the comparator also times a delay between the last lighting of an LED 40a-40c, and the first depression of one of the input buttons 50a-50c and determines simultaneously if the sequence of manual responses to the input buttons 50a-50c is correct.

If the comparator 80 determines that the vehicle operator properly replicated the random pattern generated by the RNG 20 produces a test pass signal, or okay signal, along a test pass connector path 82. However, if the comparator 80 determines the vehicle operator failed to replicate the pattern adequately, a test failed signal, or not okay signal, is generated along a test fail connector path 81.

If the test pass signal is generated, the signal travels along connector path 82 the signal may pass to both a tone generator 64 at a test pass connection 83 and to a starting enabling sub-circuit 90a for use with a keyed type ignition, as described in more detail in connection with FIGS. 2a-2d and FIGS. 3a-3d, or starting enabling sub-circuit 90b for use with a remote start type ignition, as described further in connection with FIGS. 4a-4c and FIGS. 5a-5c. The tone generator 64 is connected to a speaker 65 adapted to produce an audible tone 63 to alert the vehicle operator that the test was passed.

As shown in FIG. 1, the starting enabling sub-circuit 90a has an indicator 92 to provide a visual alert to the vehicle operator that the test was passed. The starting enabling sub-circuit 90 further has a start input 98 that disables an access preventing feature 200 (FIG. 2d) by allowing an electrical current to flow through an electro-magnetic coil 96 that causes a plunger 95 to receded into the coil 96. The movement of the plunger 95 into the coil 96 disables the access preventing feature 200 (FIG. 2d) as described in more detail in conjunction with FIGS. 2c-2d.

Also depicted in FIG. 1 is the starting enabling sub-circuit 90b that has an indicator 97 to provide a visual alert to the vehicle operator that the test was passed. The starting enabling sub-circuit 90b has a start input 99 that enables an engine starting transmitter 91 to utilize an antenna 120 to send a signal 121 adapted to start the vehicle.

If a test failed signal is generated by the comparator 80, the signal travels along test fail connector path 81 to a retest timer 100. The retest timer 100 is adapted to prevent a vehicle operator from immediately initiating another impairment test. The reset timer 100 is adapted to track the number of failed tests, and may increase a waiting period between subsequent tests.

For example, after a first failed test, the reset timer 100 may force a vehicle operator to wait ten seconds before attempting a second test. If the second test also results in a failed test, the reset timer 100 may force the vehicle operator to wait one minute before attempting a third test. If the third test is also failed, the reset timer 100 may force the vehicle operator to wait an extended time period, such as one hour, before a fourth test may be attempted. Multiple failed tests indicate that a vehicle operator is likely impaired, and an extended period of time prior to a subsequent test should exist. Research has shown that a typical human liver is capable of metabolizing about 1.5 fluid ounces of 40% alcohol per hour, thus a one hour delay may result in a vehicle operator no longer being in an impaired state.

In addition to passing to the retest timer 100 the test fail failed signal also pass to the tone generator 64 at a test fail connection 84, to provide the vehicle operator with an auditory test fail alert (not shown) via the speaker 65 that the test was failed. The test failed signal further may also affect a test failed indicator 102, that provides the vehicle operator with a visual signal that the test was failed.

The reset timer 100 produces a reset signal after a waiting period following a failed test has passed. The reset signal transmits to a one-way diode 110 adapted to deactivate the relay 15 and prevent the relay from transmitting a signal to the RNG 20 when the activation switch 12 is depressed.

Additionally, it is contemplated that a random number generator timer 140 may also be utilized. The RNG timer 140 controls the rate at which the RNG 20 generates random numbers used to illuminate the LEDs 40a-40c. The RNG timer 140 is useful in ensuring that the RNG 20 generates signals in a timeframe that a non-impaired vehicle operator may replicate, but that an impaired vehicle operator would be unlikely to successfully replicate. Additionally, the RNG timer 140 may have various settings based on a particular vehicle operator, or a class of vehicle operators. For example, the RNG timer 140 may cause the RNG 20 to generate signals at a slower rate for an older vehicle operator, as physical conditions, such as arthritis, may make an older vehicle operator take an additional period of time to replicate the signals presented by the LEDs 40a-40c on the user input buttons 50a-50c.

Still referring to FIG. 1, a battery 120 is shown to provide electrical power to the system 10. The battery 120 has an electrical ground 130. An auxiliary power supply 131 may further be present, to allow the use of the system 10 if the battery 120 does not contain sufficient charge to power the system 10. An auxiliary electrical lead 132 may provided power to the auxiliary power supply 131 from a vehicle or other outside source, such as through an electrical outlet within the vehicle. The auxiliary power supply 131 provides an important safeguard by making the system 10 fail safe, by preventing the system 10 from allowing the vehicle operator to start the vehicle by simply removing the battery 120.

While the system 10 has been described above with various vehicle operator notification elements, such as tone generator 64 and indicator lights 92, 102 it is contemplated that no such indicators may be present. The elimination of the indicators simplifies a system for deterring the operation of a vehicle while impaired, but still causes a vehicle operator to perform the same tasks prior to being able to start a vehicle. A user would simply depress the start input, such as start input 98, to see if the user has sufficiently replicated the pattern generated by the RNG 20.

While the embodiment depicted in FIG. 1 depicts a system 10 having three LEDs 40a-40c and there input buttons 50a-50c, it is contemplated that more or less of each may be present in other embodiments, but the number of LEDs and input buttons will be equal. For example, it is contemplated that only two LEDs may be present, and thus two input buttons, but the pattern generated by a RNG and displayed would involve lighting each LED a plurality of times. Further, as the pattern created by the RNG is truly random, the number of times each LED lights will vary from test to test.

Figure 2A:
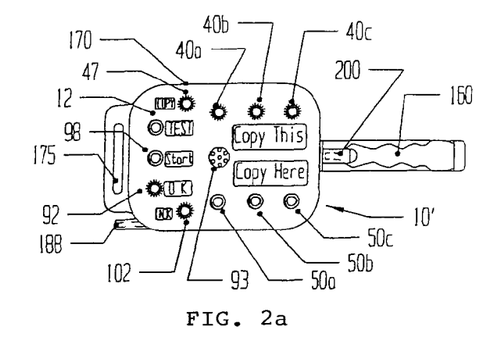
FIG. 2a is a top view of a system for deterring the operation of a vehicle while impaired according to another embodiment.

Turning now to FIGS. 2a-2e, another embodiment of a system for deterring the operation of a vehicle while impaired 10' is shown, that is similar to the system 10 having the starting enabling sub-circuit 90a (FIG. 1). As shown in FIG. 2a, a system 10' has a key shank 160, a key handle portion 170, and the access preventing feature 200, shown in the form of a plunger. The system 10' has the activation switch 12 adapted to initiate an impairment test. The impairment test illuminates the LEDs 40a-40c in a random pattern. The vehicle operator attempts to repeat this pattern using the input buttons 50a-50c. For example, if the pattern shown on the LEDs caused the LED 40b to illuminate, followed by the LED 40a, followed by the LED 40b, followed by the LED 40a, followed by the LED 40c, the vehicle operator would repeat this example pattern by depressing the input button 50b, the input button 50a, the input button 50b, the input button 50a, and the input button 50c.

If the vehicle operator successfully replicates the pattern, the indicator 92 illuminates alerting the vehicle operator that the test was passed. The vehicle operator may then depress the start input 98 to deactivate the access preventing feature 200. Depressing the start input 98 following a passed test energizes the electro-magnetic coil 96 to retract the plunger 95. (FIG. 2e) Once the plunger 95 retracts, the access preventing feature 200 may be displaced into the key handle portion 170, and the key shank portion 160 may be fully inserted into a vehicle ignition lock. Thus, as shown in FIG. 2d when the access preventing feature 200 is in an extended position, the access preventing feature contacts a key receptacle face 210 of the vehicle ignition, preventing the key shank portion 160 from being inserted far enough into the vehicle ignition to start the vehicle.

Figure 2B:
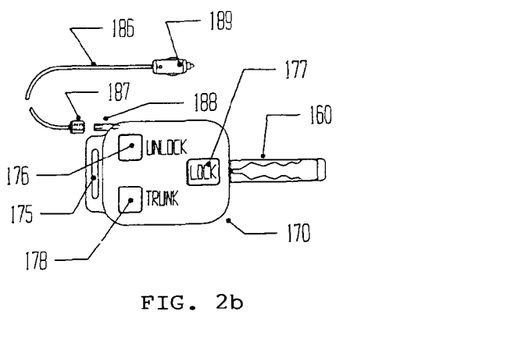
Figure 2C:
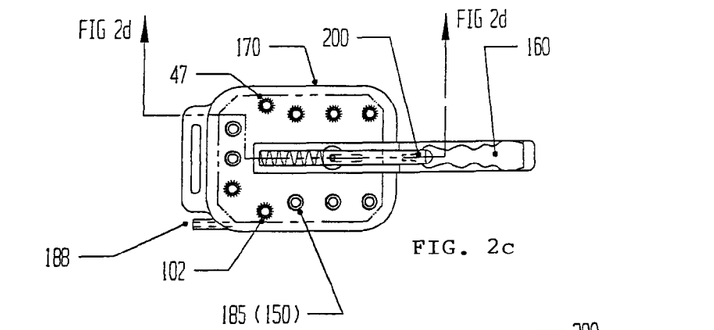
FIG. 2c is a top pictorial view of the system of FIG. 2a showing the access preventing feature in an extended position.
Figure 2D:
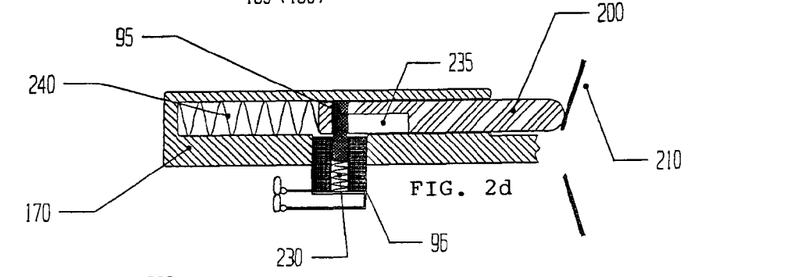
FIG. 2d is a partial cross-sectional view of the system of FIG. 2a taken along line 2d of FIG. 2c with an access preventing feature in an extended position.
Figure 2E:
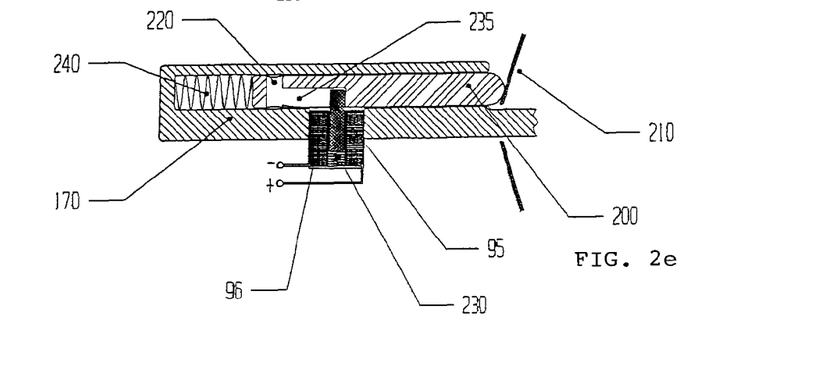
FIG. 2e is a partial cross-sectional view of the system of FIG. 2a taken along line 2d of FIG. 2c with the access preventing feature in a retracted position.

As shown in FIG. 2e, the access preventing feature 200 is retracted within the key handle portion 170, allowing the key shank portion to be inserted far enough into the vehicle ignition lock to start the vehicle. The access preventing feature 200 may still contact the key receptacle face 210, but the key shank portion 160 still extends far enough into the vehicle ignition lock to start the vehicle.

If the vehicle operator was unable to replicate the pattern, a test failure indicator 102 illuminates alerting the vehicle operator that the test was not passed. As previously described, after an amount of time has passed, the vehicle operator may press the test button 12 and initiate another attempt at an impairment test.

Referring now to FIG. 2b, the system for deterring the operation of a vehicle while impaired 10' has a key loop 175 adapted to allow the system, 10' to be placed on a keychain (not shown) featuring other keys, such as house keys. The system 10' further has unlock button 176 to remotely unlock a vehicle's doors, a lock button 177 to remotely lock a vehicle's doors, and a trunk open button 178 to remotely open a vehicle's trunk. The unlock button 176, lock button 177, and truck open button 178 are intended to function even if a vehicle operator is not able to successfully pass an impairment test. Therefore, the vehicle operator may at least access all interior spaces of a vehicle, or secure a vehicle regardless of the operator's impairment level.

Also shown in FIG. 2b a power connector 188 is shown. The power connector 188 of the system 10' is adapted to connect to an electrical cord 186 via a plug 187. The electrical cord 186 is adapted to connect to a plug 189 that may connect to an auxiliary power supply, such as a vehicle's lighter, or other power source. Such a power connector 188 allows the system 10' to be utilized should an internal power supply, such as the battery 120 (FIG. 1) fail. As the system 10' is fail-safe, in that power is required to allow the use of the key shank portion 186 in the vehicle, the power connector 188 would be useful if the vehicle operator was able to get into the vehicle, but the system 10' did not have enough internal power to perform an impairment test.

As shown in FIGS. 2d-2e, the access preventing feature 200 interacts with the plunger 95 to position the access preventing feature 200 to either prevent the key shank portion 160 from being positioned to start a vehicle (FIG. 2d) or to allow the key shank portion 160 to be positioned to start a vehicle (FIG. 2e). When the plunger 95 is in an access preventing location (FIG. 2e), the plunger 95 interacts with a hole 220 within the access preventing feature 200. The plunger 95 is retracted from an access preventing position (FIG. 2d) to an access allowing position (FIG. 2e) by the electromagnetic coil 96.

The coil 96 provides a force on the plunger 95 that compresses a plunger positioning spring 230 when a user successfully completes an impairment test. The movement of the plunger 95 withdraws the plunger 95 from the hole 220 of the access preventing feature 200, allowing the access preventing feature 200 to be moved so that the key shank portion 160 may be placed fully within the vehicle's ignition. The plunger positioning spring 230 applies a force on the plunger 95 to bias the plunger 95 into contact with the access preventing feature 200 and through the hole 220 of the access preventing feature 200 when the hole 220 and the plunger 95 align. The electromagnetic solenoid 96 must provide a force on the plunger 95 sufficient to overcome the force of the plunger positioning spring 230 when a vehicle operator successfully passes a test.

The access preventing feature 200 has a slot 235 formed therein. The slot 235 is adapted to allow the access preventing feature 200 to retract into the key handle portion 170 of the system 10'. An access preventing feature spring 240 applies a force on the access preventing feature 200 so as to position the hole 220 of the access preventing feature 200 so that it generally aligns with the plunger 95. When the vehicle operator successfully passes the impairment test and the plunger 95 withdraws from the hole 220, the action of the vehicle operator placing the key shank portion 160 into the vehicle's ignition switch causes the access preventing feature spring 240 to compress.

When the key shank portion 160 of the system 10' is withdrawn from the vehicle ignition the access preventing feature spring 240 pushes against the access preventing feature 200 to align the hole 220 of the access preventing feature with the plunger 95. Once the hole 220 and the plunger 95 align, the plunger positioning spring 230 positions the plunger 95 into the hole 220 of the access preventing feature 200, thus requiring the vehicle operator to successfully pass an impairment test before being able to reinsert the key shank portion 160 into the vehicle's ignition.

Turning now to FIGS. 3a-3e, a further embodiment of a system for deterring the operation of a vehicle while impaired 10" is shown, that is similar to the system 10' and the system 10 having the starting enabling sub-circuit 90a.

Figures 3A, 3B, 3C, 3D, 3E:
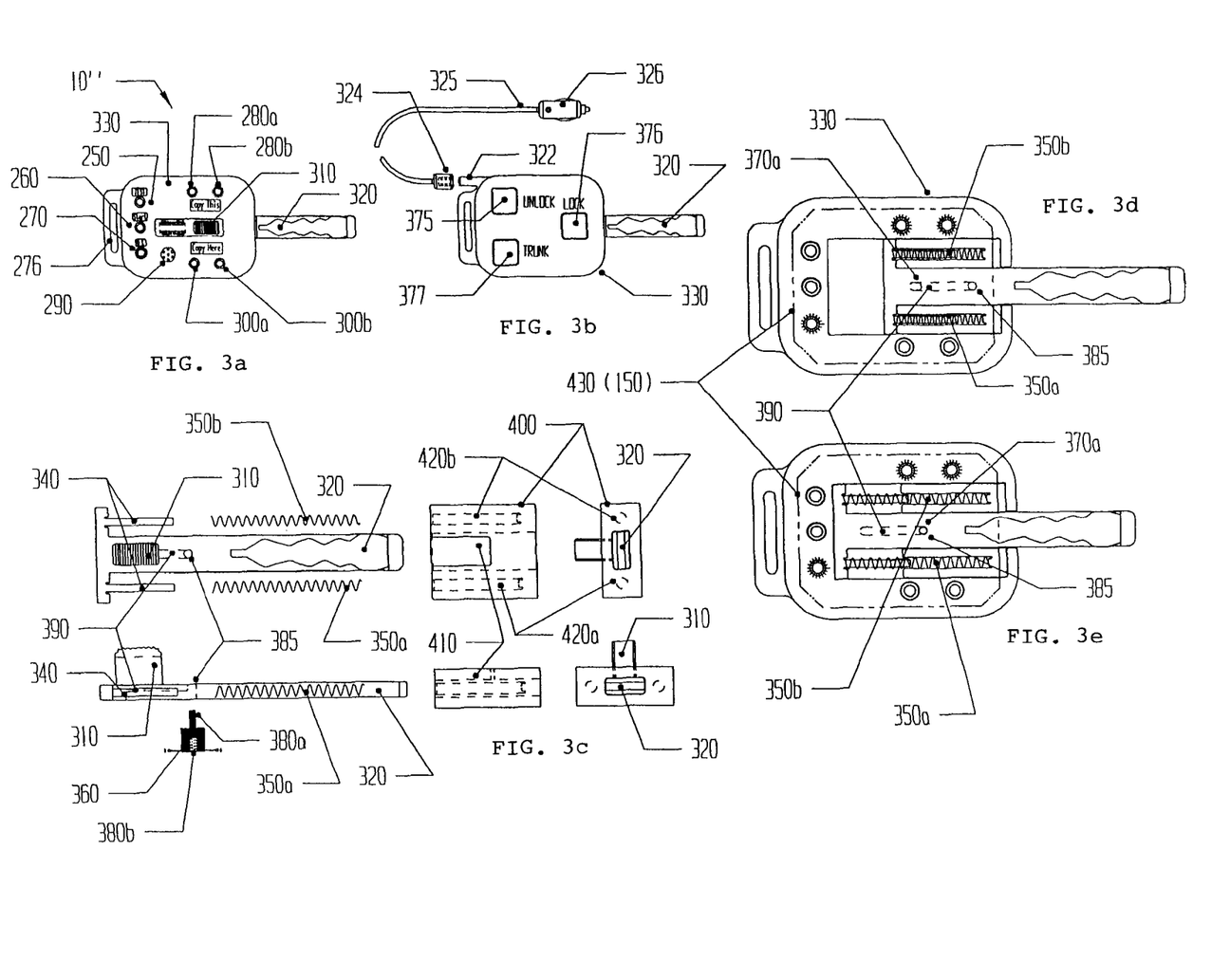

As shown in FIG. 3a, a system 10" has a key shank 320, a key handle portion 330, and an access preventing feature 400, shown in the form of a key housing within the key handle portion 330. The system 10" has the activation switch 250 adapted to initiate an impairment test. The impairment test illuminates a pair of LEDs 280a-280b in a random pattern. The vehicle operator attempts to repeat this pattern using a pair of input buttons 300a-300b. For example, if the pattern shown on the LEDs caused the LED 280b to illuminate, followed by the LED 280a, followed by the LED 280b, followed by the LED 280a, followed by the LED 280a the vehicle operator would repeat this example pattern by depressing the input button 300b, the input button 300a, the input button 300b, the input button 300a, and the input button 300a.

If the vehicle operator successfully replicates the pattern, the indicator 270 illuminates alerting the vehicle operator that the test was passed, and a speaker 290 may generate a test passed tone. The vehicle operator may then depress a start input 260 to allow the key shank portion 320 to be extended out from the handle portion 330 using a slider 310. Depressing the start input 260 following a passed test energizes the electro-magnetic coil 360 to retract the plunger 370a. Once the plunger 370a retracts, the key shank portion 320 may contact the key housing 400 to extend the key shank portion 320 fully out of the key handle portion 330, and the key shank portion 320 may be inserted in a vehicle ignition lock. Thus, as shown in FIG. 3e, when the key shank portion 320 is in a retracted position within the handle portion 330 the key shank portion 320 is prevented from being inserted far enough into the vehicle ignition far enough to start the vehicle.

As shown in FIGS. 3c-3e, the access preventing group of features including the key housing 400 embedded securely and non-movingly within the key handle 330, the electromagnetic solenoid comprised of a magnetic plunger 370a a solenoid winding 360 and an extension spring 380 and a partial slot 390 and accompanying through-hole 385 which are placed within the key shank portion shown such that the solenoid plunger 370a has been retracted form the securing through-hole 385 so that the manual thumb slider 310 can extended within the key handle portion 330, allowing the key shank portion 320 to be inserted far enough into the vehicle ignition lock to start the vehicle. The key housing 400 has a slot 410 adapted to allow the slider 310 to enter the key housing 400 to extend the key shank portion 320 to a position to be inserted into the vehicle's ignition lock. The key housing 400 additionally has two guide holes 420a, 420b adapted to interact with springs 350a, 350b to help position the key shank portion 320. The springs 350a, 350b apply a force on the key shank portion 320 to bias the key shank portion 320 to a location within the handle portion 330, as shown in FIG. 3e. As may be observed in FIG. 3d, the springs 350a, 350b compress when the key shank portion 320 is extended from the key handle portion 330. In such a case, the springs 350a, 350b and corresponding structures of the key retract the key partially within the key handle portion 330 so that the key shank portion 320 does not extend far enough to enable the key shank portion 320 to extend far enough into the ignition lock to start the vehicle.

Referring now to FIG. 3b, the system for deterring the operation of a vehicle while impaired 10" has a key loop 276 adapted to allow the system, 10" to be placed on a keychain (not shown) featuring other keys, such as house keys. The system 10" further has an unlock button 375 to remotely unlock a vehicle's doors, a lock button 376 to remotely lock a vehicle's doors, and a trunk open button 377 to remotely open a vehicle's trunk. The unlock button 375, lock button 376, and truck open button 377 are intended to function even if a vehicle operator is not able to successfully pass an impairment test. Therefore, the vehicle operator may at least access all interior spaces of a vehicle, or secure a vehicle regardless of the operator's impairment level.

Also shown in FIG. 3b a power connector 322 is shown. The power connector 322 of the system 10" is adapted to connect to an electrical cord 325 via a plug 324. The electrical cord 325 is adapted to connect to a plug 326 that may connect to an auxiliary power supply, such as a vehicle's lighter, or other power source. Such a power connector 322 allows the system 10" to be utilized should an internal power supply, such as the battery 440 (FIG. 3e) fail. As the system 10" is fail-safe, in that power is required to allow the use of the key shank portion 320 in the vehicle, the power connector 322 would be useful if the vehicle operator was able to get into the vehicle, but the system 10" did not have enough internal power to perform an impairment test.

As shown in FIGS. 3d-3e, the key shank portion 320 interacts with the plunger 370a to either prevent the key shank portion 320 from being positioned to start a vehicle (FIG. 3e) or to allow the key shank portion 320 to be positioned to start a vehicle (FIG. 3d). When the plunger 370a is in an access preventing location (FIG. 3d), the plunger 370a interacts with a hole 385 within the key shank portion 320. The plunger 370a is retracted from an access preventing position (FIG. 3e) to an access allowing position (FIG. 3d) by the electromagnetic coil 360.

The coil 360 provides a force on the plunger 380a that compresses a plunger positioning spring 380b when a user successfully completes an impairment test. The movement of the plunger 380a withdraws the plunger 380a from the hole 385 of the key shank portion 320, allowing the key shank portion 320 to slide towards the key holder 400 so that the key shank portion 320 may be placed fully within the vehicle's ignition. The plunger positioning spring 380b applies a force on the plunger 380a to bias the plunger 380a into contact with the key shank portion 320 and through the hole 385 of the key shank portion 320 when the hole 385 and the plunger 380a align. The electromagnetic solenoid 360 must provide a force on the plunger 380a sufficient to overcome the force of the plunger positioning spring 380b when a vehicle operator successfully passes a test.

The key shank portion 320 has a slot 390 formed therein. The slot 390 is adapted to allow the key shank portion 320 to extend from the key handle portion 330 of the system 10" when a vehicle operator successfully completes an impairment test. A pair of access preventing feature springs 350a, 350b apply a force on the key shank portion 320 so as to position the hole 385 of the key shank portion 320 so that it generally aligns with the plunger 370a. When the vehicle operator successfully passes the impairment test and the plunger 380a withdraws from the hole 385, the action of the vehicle operator sliding the key shank portion 320 with the slider 310 and placing the key shank portion 320 into the vehicle's ignition switch causes the access preventing feature springs 350a to compress. The key shank portion 320 has a pair of extension elements 340 adapted to have the access preventing feature springs 350a and 350b coil about the extension elements 340. The extension elements 340 help to prevent the springs 350a and 350b from possibly buckling.

When the key shank portion 320 of the system 10" is withdrawn from the vehicle ignition the access preventing feature springs 350a, 350b pushes against key holder 400 and the extension 340 of the key shank portion 320 to align the hole 385 of the key shank portion 320 with the plunger 380a. Once the hole 385 and the plunger 380a align, the plunger positioning spring 380b positions the plunger 380a into the hole 385 of the key shank portion 320, thus requiring the vehicle operator to successfully pass an impairment test before being able to reinsert the key shank portion 320 into the vehicle's ignition.

Figures 4A, 4B, 4C:
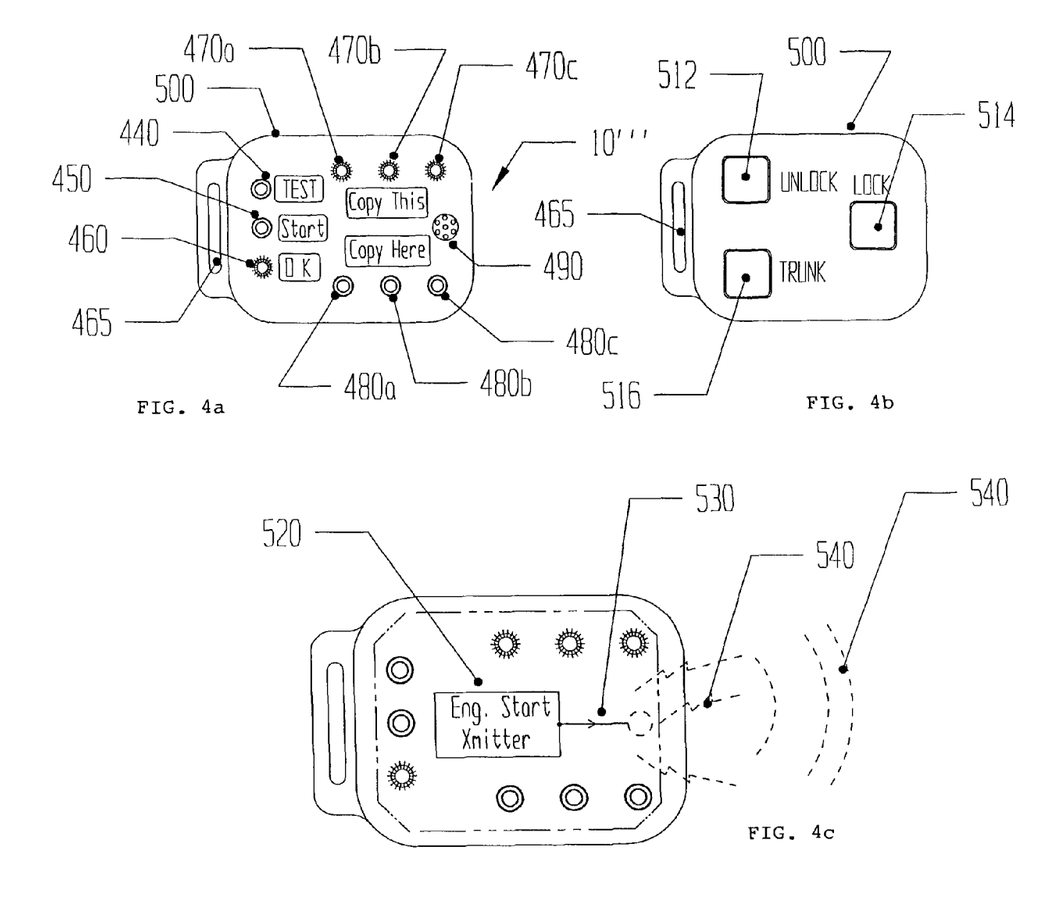

Turning now to FIGS. 4a-4c, a further embodiment of a system for deterring the operation of a vehicle while impaired 10''' is shown, that is similar to the system 10 having the starting enabling sub-circuit 90b. As shown in FIG. 4a, a system 10''' is a "keyless" type vehicle key in that a transmitter is used to send a signal that initiates starting the vehicle. The system 10''' has a key handle portion 500, with an access preventing feature within the circuitry, such as shown in FIG. 1. The system 10''' has the activation switch 440 adapted to initiate an impairment test. The impairment test illuminates the LEDs 470a-470c in a random pattern. The vehicle operator attempts to repeat this pattern using the input buttons 480a-480c. For example, if the pattern shown on the LEDs caused the LED 470b to illuminate, followed by the LED 470a, followed by the LED 470b, followed by the LED 470a, followed by the LED 470c, the vehicle operator would repeat this example pattern by depressing the input button 480b, the input button 480a, the input button 480b, the input button 480a, and the input button 480c.

If the vehicle operator successfully replicates the pattern, a test pass indicator 460 illuminates alerting the vehicle operator that the test was passed. A speaker 490 additionally generates an optional tone indicating that the test was passed. The speaker may also generate an optional alternate tone if a test is failed. The vehicle operator may then depress the start input 450 to allow a transmitter 520 having an antenna 530 of the system 10''' to transmit a signal 540 (FIG. 4c) that activates a starter on the vehicle.

Referring now to FIG. 4b, the system for deterring the operation of a vehicle while impaired 10''' has a key loop 465 adapted to allow the system, 10''' to be placed on a keychain (not shown) featuring other keys, such as house keys. The system 10''' further has unlock button 512 to remotely unlock a vehicle's doors, a lock button 514 to remotely lock a vehicle's doors, and a trunk open button 516 to remotely open a vehicle's trunk. The unlock button 512, lock button 514, and truck open button 516 are intended to function even if a vehicle operator is not able to successfully pass an impairment test. Therefore, the vehicle operator may at least access all interior spaces of a vehicle, or secure a vehicle regardless of the operator's impairment level.

As with the systems for deterring the operation of a vehicle while impaired described above, it is contemplated that the system 10''' may additionally have an indicator to show that a test was not successfully passed, such as test fail indicator 102 (FIG. 2a). It is also contemplated that the system 10''' may additionally have a power connector, such as power connector 188 (FIG. 2c).

Figures 5A, 5B, 5C, 5D, 6:
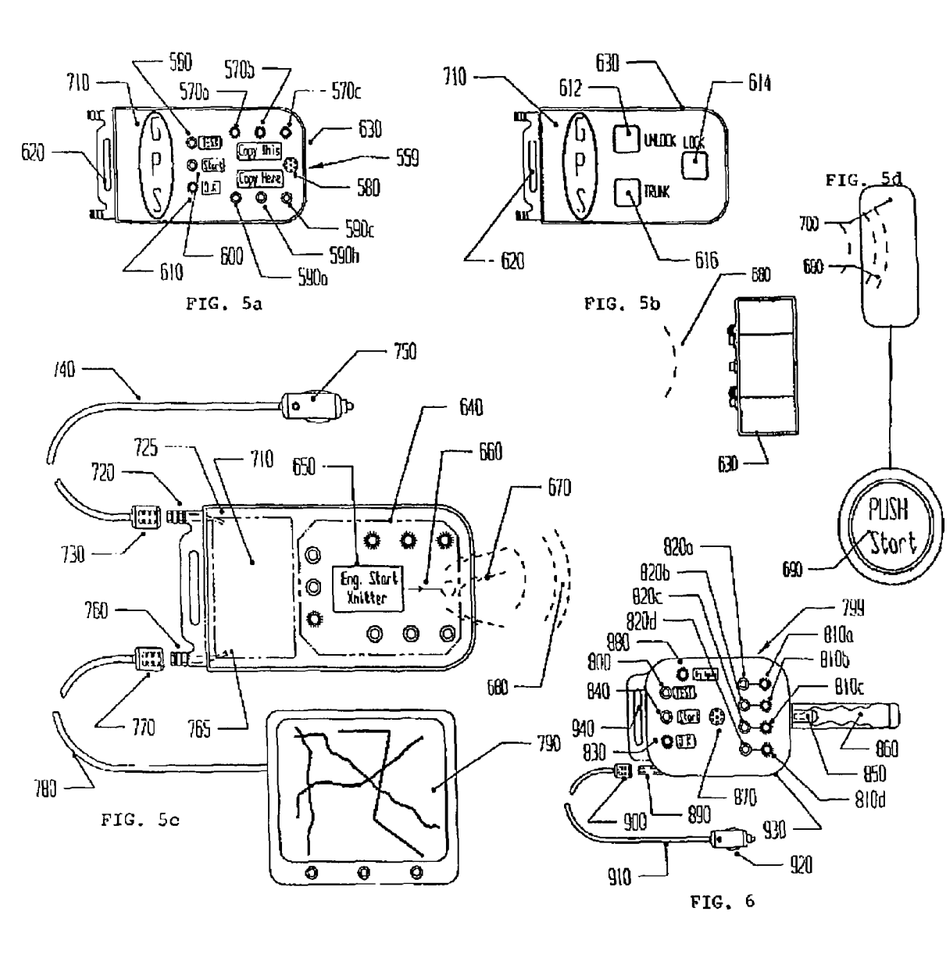

As shown in FIGS. 5a-5c, still yet another embodiment of a system for deterring the operation of a vehicle while impaired 559 is shown, that is similar to the system 10 having the starting enabling sub-circuit 90b and the system 10''' shown in FIGS. 4a-4d and described above. As shown in FIG. 5a, a system 559 is a "keyless" type vehicle key in that a transmitter is used to send a signal that initiates starting the vehicle. The system 559 has a key handle portion 630, with an access preventing feature within the circuitry, as shown in FIG. 1. The system 559 has an activation switch 560 adapted to initiate an impairment test. The impairment test illuminates the LEDs 570a-570c in a random pattern. The vehicle operator attempts to repeat this pattern using the input buttons 590a-590c. For example, if the pattern shown on the LEDs caused the LED 570b to illuminate, followed by the LED 570a, followed by the LED 570b, followed by the LED 570a, followed by the LED 570c, the vehicle operator would repeat this example pattern by depressing the input button 590b, the input button 590a, the input button 590b, the input button 590a, and the input button 590c The system 559 additionally has a global positioning system ("GPS") 710. The GPS 710 is capable of determining an exact location of the system 559 and the vehicle operator.

If the vehicle operator successfully replicates the pattern, a test pass indicator 610 illuminates alerting the vehicle operator that the test was passed. A speaker 580 additionally, but optionally, generates a tone indicating that the test was passed. The speaker 580 may also optionally generate an alternate tone if a test is failed. The vehicle operator may then depress the start input 600 to allow a transmitter 640 having an antenna 660 of the system 559 to transmit a signal 670 (FIG. 5c) that activates a starter on the vehicle.

Referring now to FIG. 5b, the system for deterring the operation of a vehicle while impaired 559 has a key loop 620 adapted to allow the system 559 to be placed on a keychain (not shown) featuring other keys, such as house keys. The system 559 further has unlock button 612 to remotely unlock a vehicle's doors, a lock button 614 to remotely lock a vehicle's doors, and a trunk open button 616 to remotely open a vehicle's trunk. The unlock button 612, lock button 614, and truck open button 616 are intended to function even if a vehicle operator is not able to successfully pass an impairment test. Therefore, the vehicle operator may at least access all interior spaces of a vehicle, or secure a vehicle regardless of the operator's impairment level.

As shown in FIG. 5c a power connector 720 is shown. The power connector 720 connects via a lead 725 to the system 559. The power connector 720 of the system 559 is adapted to connect to an electrical cord 740 via a plug 730. The electrical cord 740 is adapted to connect to a plug 750 that may connect to an auxiliary power supply, such as a vehicle's lighter, or other power source. Such a power connector 720 allows the system 559 to be utilized should an internal power supply fail. As the system 559 is fail-safe, in that power is required to allow the use of the system 559, the power connector 720 would be useful if the vehicle operator was able to get into the vehicle, but the system 559 did not have enough internal power to perform an impairment test.

Also shown in FIG. 5c, is a data connector 760. The data connector 760 connects via a lead 765 to the system 559. The data connector 760 of the system 559 is adapted to connect via a plug 770 to a data cable 780. The data cable also connects to a display unit 790. The display unit 790 is adapted to display GPS data output from the GPS circuit 710 of the system 559 from the data connector 760 via the data cable 780. Thus, the GPS circuit 710 connected to the display unit 790 allows a vehicle operator to know their exact location. This information may be useful if the vehicle operator is impaired and needs to arrange alternate transportation. The GPS 710 may also be useful if the vehicle operator's is being monitored, as may be ordered by a court of law, or by an employer if the vehicle operator is utilizing a company vehicle.

Yet another embodiment of an all electronic impaired driver detection key is shown in FIG. 5d. Certain vehicles are equipped with a system in which, instead of a key shank, for example being inserted and turned in its starter receptacle, a simple START button 690 is used to start the engine. However, what is actually happening is that the key 630 and a receiver in the vehicle 700 transpond with one another using signals 680. For example, the receiver 700 can emit a signal code to check to see if the user has the proper key—that is, the receiver must confirm that the proper key is nearby (or if no key is nearby, the engine will not start when the START button 690 is depressed).

In the case of impairment detection key 630, in order for it to transpond correctly with receiver 700 and enable the START button 690 to start the engine, the user must have successfully passed which ever impairment test key 630 embodies (in this case, the "follow the lights" test shown in FIG. 5c is exemplified).

FIG. 6 SHOWS yet another embodiment of a system for deterring the operation of a vehicle while impaired 799 is shown, that is similar to the system 10 having the starting enabling sub-circuit 90a as well as the system 10' described above in connection with FIGS. 2a-2e. As shown in FIG. 6, a system 799 has a key shank 860, a key handle portion 930, and the access preventing feature 850, shown in the form of a plunger. The system 799 has the activation switch 800 adapted to initiate an impairment test. The impairment test illuminates the LEDs 820a-820d one at a time. The vehicle operator attempts to press an input button 810a-810d corresponding to the one LED 820a-820d that is presently illuminated. The LEDs 820a-820d continue to illuminate in a random pattern and the vehicle operator continues to attempt to press the [on of the?] input buttons 810a-810d corresponding to the lit LEDs.

For example, if the LED 820b illuminates the vehicle operator presses input button 810b, followed by the LED 820a the vehicle operator presses input button 810a, followed by the LED 820d the vehicle operator presses input button 810d, followed by the LED 820c the vehicle operator presses input button 810c, followed by the LED 820a the vehicle operator presses input button 810a. Thus, in a short time period the vehicle operator is presented with a number of stimuli in the form of the LEDs 820a-820d illuminating, and must rapidly press the user input buttons 810a-810d corresponding to the presently illuminated LED. Unlike the impairment test described in connection with FIGS. 2a-2d that also tests the vehicle operator's memory, the presently described impairment test is directed almost solely to the vehicle operator's rapidity of visual neuro-motor response. The length of the pattern according to such an impairment test may be from about eight to about twenty illuminations of the LEDs 820a-820d. Thus, if the vehicle operator is able to successfully press the input button 810a-810d corresponding to the presently illuminated one of the LEDs 820a-820d, the test will be considered passed. If the vehicle operator makes an error, the test will be considered failed.

If the vehicle operator successfully passes the test the indicator 830 illuminates alerting the vehicle operator that the test was passed. A speaker 870 may also produce a tone indicating the test was passed. The vehicle operator may then depress the start input 840 to deactivate the access preventing feature 850 following a passed test as described above.

If the vehicle operator was unable to replicate the pattern, a test failure indicator 880 illuminates alerting the vehicle operator that the test was not passed. As previously described, after an amount of time has passed, the vehicle operator may press the test button 800 and initiate another attempt at an impairment test.

The system for deterring the operation of a vehicle while impaired 799 has a key loop 940 adapted to allow the system, 799 to be placed on a keychain (not shown) featuring other keys, such as house keys.

A power connector 890 may also be present on the system 799. The power connector 890 of the system 799 is adapted to connect to an electrical cord 910 via a plug 900. The electrical cord 910 is adapted to connect to a plug 920 that may connect to an auxiliary power supply, such as a vehicle's lighter, or other power source. Such a power connector 890 allows the system 799 to be utilized should an internal power supply, such as the battery 120 (FIG. 1) fail. As the system 799 is fail-safe, in that power is required to allow the use of the key shank portion 860 in the vehicle, the power connector 890 would be useful if the vehicle operator was able to get into the vehicle, but the system 799 did not have enough internal power to perform an impairment test. As indicated above, the reverse side of said impairment key device is also configured to allow the vehicle operator to at least access all interior spaces of a vehicle, or secure a vehicle regardless of the operator's impairment level.

Figure 7:
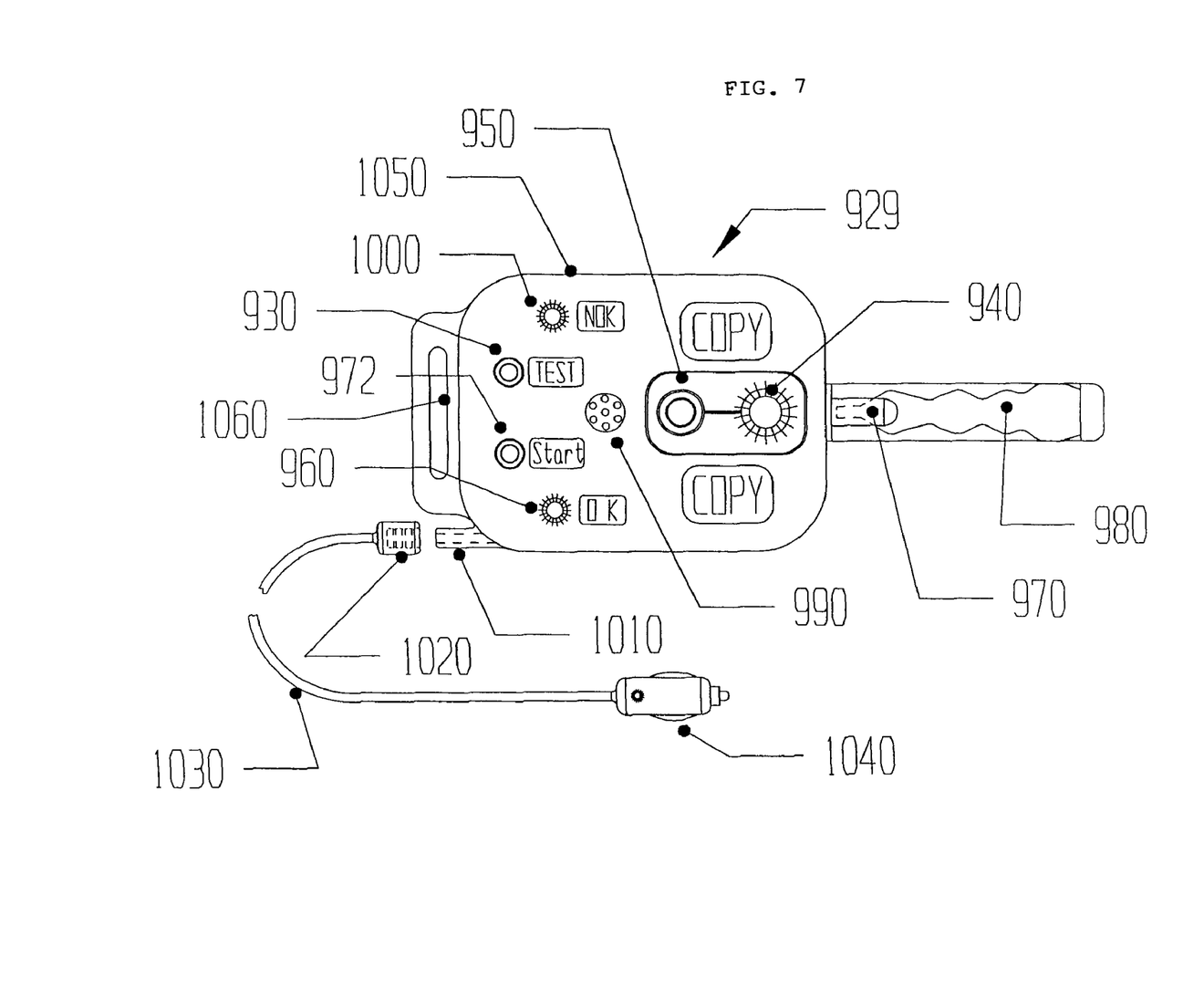
FIG. 7 is a top view of a system for deterring the operation of a vehicle while impaired according to still yet a further embodiment.

Finally, FIG. 7 depicts still yet a further embodiment of a system for deterring the operation of a vehicle while impaired 929 is shown, that is similar to the system 10 having the starting enabling sub-circuit 90a (FIG. 1) as well as the system 10' (FIGS. 2a-2e) described above. As shown in FIG. 7, a system 929 has a key shank 980, a key handle portion 1050, and the access preventing feature 970, shown in the form of a plunger. The system 929 has an activation switch 930 adapted to initiate an impairment test. The impairment test illuminates the LED 940 in a series of random short illuminations and long illuminations. The vehicle operator attempts to nearly simultaneously replicate the pattern present by the LED 940 using an input button 950. Alternatively, arrangement 929 can be arranged so that the test can be administered through responding to the input button 950 after a series of long and short flashes have occurred, thus invoking a measure of memory testing. The LED 940 continues to illuminate in a random pattern of long illuminations and short illuminations. An auditory tone from a speaker 990 may be used to indicate the start and end of the impairment test.

For example, if the LED 940 illuminates for short time the vehicle operator presses the input button 950 for a short period, followed by the LED 940 illuminating for a longer time the vehicle operator presses input button 950 for a longer time, followed by the LED 940 illuminating for a longer time the vehicle operator presses input button 950 for a longer time, followed by the LED 940 illuminating for a shorter time the vehicle operator presses input button 950 for a shorter time, followed by the LED 940 illuminating for a longer time the vehicle operator presses input button 950 for a longer time. Thus, in a short time period the vehicle operator is presented with a number of stimuli in the form of long and short length illuminations of the LED 940, and must rapidly press the user input button 950 for a time corresponding to the length of time the LED 940 is illuminated. Unlike the impairment test described in connection with FIGS. 2a-2d that also tests the vehicle operator's memory, the presently described impairment test is directed to the vehicle operator's neuro-motor response. The length of the pattern according to such an impairment test may be from about four to about ten illuminations of the LED 940. Thus, if the vehicle operator is able to successfully press the input button 950 for the correct amount of time corresponding to the illumination of the LED 940, the test will be considered passed. If the vehicle operator makes an error, the test will be considered failed.

Alternatively, the vehicle operator could be presented with a random pattern of long and short illuminations of the LED 940 that must be memorized. The vehicle operator would then attempt to duplicate the random pattern using the input button 950. Such an alternative test further measures the vehicle operator's memory.

If the vehicle operator successfully passes the test the indicator 960 illuminates alerting the vehicle operator that the test was passed. A speaker 990 may also produce a tone indicating the test was passed. The vehicle operator may then depress the start input 972 to deactivate the access preventing feature 970 following a passed test as described above.

If the vehicle operator was unable to replicate the pattern, a test failure indicator 1000 illuminates alerting the vehicle operator that the test was not passed. As previously described, after an amount of time has passed, the vehicle operator may press the test button 930 and initiate another attempt at an impairment test.

The system for deterring the operation of a vehicle while impaired 929 has a key loop 1060 adapted to allow the system, 929 to be placed on a keychain (not shown) featuring other keys, such as house keys.

A power connector 1010 may also be present on the system 929. The power connector 1010 of the system 929 is adapted to connect to an electrical cord 1030 via a plug 1020. The electrical cord 1030 is adapted to connect to a plug 1040 that may connect to an auxiliary power supply, such as a vehicle's lighter, or other power source. Such a power connector 1010 allows the system 929 to be utilized should an internal power supply, such as the battery 120 (FIG. 1) fail. As the system 929 is fail-safe, in that power is required to allow the use of the key shank portion 980 in the vehicle, the power connector 1010 would be useful if the vehicle operator was able to get into the vehicle, but the system 929 did not have enough internal power to perform an impairment test.

While the impairment tests described herein involve requiring the vehicle operator to perform a test successfully a single time, it is contemplated that the vehicle operator may have to successfully perform a plurality of tests prior to being able to overcome an access preventing feature. For example, a first random pattern may be generated and displayed to the vehicle operator that the vehicle operator has to attempt to replicate using a user input. A comparison is made of the first input from the vehicle operator with the first random pattern. If the first input from the vehicle operator sufficiently matches the first random pattern, a second random pattern is generated and displayed to the vehicle operator. The vehicle operator attempts to replicate the second random pattern using the user input. If the second input from the vehicle operator sufficiently matches the second random pattern, the access preventing feature is disabled. If the vehicle operator fails to sufficiently match the first random pattern, the test is failed. If the vehicle operator sufficiently matches the first random pattern, but fails to sufficiently match the second random pattern, the test is failed. While described with connection with two generated random pattern, it is contemplated that more than two generated random patterns may be generated and presented to the vehicle operator as described herein. Again as indicated above, the reverse side of said impairment key device is also configured to allow the vehicle operator to at least access all interior spaces of a vehicle, or secure a vehicle regardless of the operator's impairment level.

While the foregoing has described what is considered to be the best mode and/or other examples, it is understood that various modifications may be made therein and that the subject matter disclosed herein may be implemented in various forms and examples, and that they may be applied in numerous other applications, combinations and environments, only some of which have been described herein. Those of ordinary skill in that art will recognize that the disclosed aspects may be altered or amended without departing from the true spirit and scope of the subject matter. Therefore, the subject matter is not limited to the specific details, exhibits and illustrated examples in this description. It is intended to protect any and all modifications and variations that fall within the true scope of the advantageous concepts disclosed herein.

I claim:

1. A self-contained system for determining impairment of a vehicle operator comprising:
   an ignition starting device to initiate starting of the vehicle;
   an electrical source to provide electrical power the system;
   an input to allow a potential driver to initiate a driver impairment test;
   a random pattern generator to generate a random pattern for testing a neuro-motor ability of the potential driver;
   a plurality of lights for displaying the random pattern by illuminating the plurality of lights in the random pattern;
   a user input to allow the user to replicate the generated random pattern simultaneously with displaying of the random pattern to test the potential driver's rapidity of visual neuro-motor response;
   a processing device for controlling the system and comparing data from the user input to the generated random pattern and determine if the input matches the generated random pattern; and
   an access preventing feature controlled by the processing device, the access preventing feature disabling the ignition starting device from initiating the starting of the vehicle unless the processor determines the user input matches the generated random pattern, the self-contained system eliminating a requirement for modifying an ignition system of the vehicle.

2. The system of claim 1 wherein the ignition starting device is a key portion to be inserted into an ignition lock of the vehicle to initiate the starting of the vehicle.

3. The system of claim 2 wherein the access preventing feature comprises a blocking element to prevent insertion of the key portion into the ignition lock.

4. The system of claim 3 wherein the blocking element interacts with an electro-magnetic solenoid that activates upon receiving a signal from the processor to retract a solenoid plunger when the processor determines the user input matches the generated random pattern allowing the blocking element to retract enabling the key portion to be inserted into the ignition lock.

5. The system of claim 2 wherein the access preventing feature comprises a key portion retracting mechanism to prevent insertion of the key portion into the ignition lock.

6. The system of claim 5 wherein the key portion retracting element interacts with an electro-magnetic solenoid that activates upon receiving a signal from the processor to retract a solenoid plunger when the processor determines the user input sufficiently matches the generated random pattern allowing the key portion extending mechanism to position the key portion to be inserted into the ignition lock.

7. The system of claim 1 wherein the processor compares the user input and a length of time the user required for completing the input to the displayed random pattern and predetermined length of time, respectively.

8. The system of claim 1 wherein the ignition starting device is a transponding device that communicates with an ignition receiver to initiate the starting of the vehicle.

9. The system of claim 1 further comprising:
   a global positioning system capable of determining an exact location of the system and the driver.

10. A method of determining an impairment level of a vehicle operator and preventing operation of a vehicle in an impaired state comprising the steps of:
   providing a self-contained detection system independent of an ignition system of the vehicle for determining impairment of the vehicle operator, the system having an ignition starting device adapted to initiate starting of the vehicle and an access preventing feature for disabling the ignition starting device from initiating the starting of the vehicle, an operation of the provided system comprising the steps of:
generating a random pattern for the vehicle operator to replicate;
displaying the random pattern to the vehicle operator;
accepting input from the vehicle operator simultaneously with displaying of the random pattern to test the potential driver's rapidity of visual neuro-motor response;
comparing input from the vehicle operator to the generated random pattern;
determining whether the accepted input matches the generated random pattern; and
disabling the access preventing features when the input matches the generated random pattern and enabling the access preventing features when the input does not match the generated random pattern.

11. The method of claim 10 further comprising the steps of:
signaling the vehicle operator of the result of the test; and
indicating a time period that must elapse prior to repeating the test when the accepted input does not match the generated random pattern.

12. The method of claim 11, wherein the time period increases progressively for each next test when the accepted input does not match the generated random pattern.

13. The method of claim 10, wherein disabling the access preventing feature includes the step of:
retracting a key portion blocking element allowing the key portion to be inserted into an ignition lock.

14. The method of claim 10, wherein disabling the access preventing feature includes the step of:
extending the key portion allowing the key portion to be inserted into an ignition lock.

15. The method of claim 10, wherein disabling the access preventing feature includes the step of:
generating and transmitting a signal to enable a remote engine start button.

16. The method of claim 10, wherein the input comparison step further includes the step of:
evaluating a time required for the vehicle operator to provide the input.

17. The method of claim 10, wherein displaying the random pattern includes the step of:
illuminating a plurality of lights to display the pattern.

18. The method of claim 17, wherein displaying the random pattern further includes the step of:
outputting a plurality of auditory signal corresponding to the plurality of lights.

19. The method of claim 10, wherein disabling the access preventing step includes the step of:
generating and transmitting a signal to allow the vehicle to be started using a remote starting device.

20. The method of claim 10 wherein the accepting input form the vehicle operator occurs after the displaying the random pattern.

21. The system of claim 20 wherein the first input and the second input are located on a user interface.

22. The method of claim 10 wherein the displaying the random pattern illuminates the single light in a pattern having at least two lengths of illumination.

23. The method of claim 10 further comprising the step of:
providing a global positioning system capable of determining an exact location of the system and the driver.

24. A system for determining impairment of a vehicle operator comprising:
a transmitter adapted to initiate starting of the vehicle;
an electrical source adapted to power the system;
a random pattern generator adapted to generate a random pattern of LED lights;
a user input adapted to allow the user to attempt to replicate the generated random pattern simultaneously with displaying of the random pattern to test the potential driver's rapidity of visual neuro-motor response;
a processor adapted to compare data from the user input to the generated random pattern and determine if the input matches the generated random pattern; and
an access preventing feature, the access preventing feature disabling the transmitter from initiating the starting of the vehicle unless the processor determines the user input matches the generated random pattern.

25. The system of claim 24 further comprising:
a global positioning system capable of determining an exact location of the system and the driver.

* * * * *